(12) United States Patent
Wienders

(10) Patent No.: US 11,104,404 B2
(45) Date of Patent: Aug. 31, 2021

(54) STOKES DRIFTER

(71) Applicant: FLORIDA STATE UNIVERSITY RESEARCH FOUNDATION, INC., Tallahassee, FL (US)

(72) Inventor: Nicolas Wienders, Tallahasse, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 95 days.

(21) Appl. No.: 16/469,924

(22) PCT Filed: Dec. 15, 2017

(86) PCT No.: PCT/US2017/066681
§ 371 (c)(1),
(2) Date: Jun. 14, 2019

(87) PCT Pub. No.: WO2018/112347
PCT Pub. Date: Jun. 21, 2018

(65) Prior Publication Data
US 2020/0079475 A1 Mar. 12, 2020

Related U.S. Application Data

(60) Provisional application No. 62/435,026, filed on Dec. 15, 2016.

(51) Int. Cl.
*B63B 22/00* (2006.01)
*G01W 1/00* (2006.01)
(Continued)

(52) U.S. Cl.
CPC ............... *B63B 22/00* (2013.01); *B63B 5/24* (2013.01); *H01Q 9/0407* (2013.01);
(Continued)

(58) Field of Classification Search
CPC .......... G01W 1/14; G01W 1/08; G01W 1/00; G01W 1/12; G01W 1/02; G01W 1/04;
(Continued)

(56) References Cited

U.S. PATENT DOCUMENTS

| 4,158,306 A * | 6/1979 | Brainard, II | ........ G01P 13/0013 |
| | | | 73/170.01 |
| 6,847,326 B2 * | 1/2005 | Harigae | ................ G01S 19/396 |
| | | | 342/357.57 |

(Continued)

OTHER PUBLICATIONS

International Search Report issued in PCT/US2017/066681, dated Jul. 3, 2018, 2 pages.

*Primary Examiner* — Andre J Allen
(74) *Attorney, Agent, or Firm* — Eversheds Sutherland (US) LLP

(57) ABSTRACT

The present disclosure relates to drifters that float and take measurements at, or very near, a surface of a body of water. The drifters may have a design that reduces wind force effects but does not diminish Stokes drift force effects. The drifters may have two opposing exterior surfaces with antennas and sensors on each of the opposing surfaces so that the drifters may always utilize at least some of the antennas and sensors, regardless of the drifter's orientation in the water.

19 Claims, 8 Drawing Sheets

(51) Int. Cl.
*B63B 5/24* (2006.01)
*H01Q 9/04* (2006.01)
*G01S 19/13* (2010.01)
*H01Q 1/24* (2006.01)

(52) U.S. Cl.
CPC ... *B63B 2005/242* (2013.01); *B63B 2022/006* (2013.01); *B63B 2211/02* (2013.01); *G01S 19/13* (2013.01); *H01Q 1/241* (2013.01)

(58) Field of Classification Search
CPC ... G01W 1/10; G01W 1/16; G01W 2001/006; G01W 1/06; G01W 1/17; G01W 2201/00; G01W 2203/00; B64D 15/20; G01N 33/1886; G01N 33/18; G01N 1/10; G01N 1/12; G01N 33/1806; G01N 1/16; G01N 2021/6432; G01N 2021/6434; G01N 21/78; G01N 21/80; G01N 27/223; G01N 33/1826; G01N 33/24; G01N 15/065; G01N 2001/021; G01N 2021/1793; G01N 2033/1873; G01N 21/538; G01N 21/59; G01N 2203/0082; G01N 2291/023; G01N 2291/0251; G01N 2291/02827; G01N 2291/0422; G01N 2291/0426; G01N 2291/0427; G01N 2291/044; G01N 2291/105; G01N 25/04; G01N 27/02; G01N 27/221; G01N 29/11; G01N 29/22; G01N 29/34; G01N 29/4427; G01N 3/064; G01N 3/34; G01N 3/42; G01C 13/00; G01C 13/002; G01C 13/008; G01C 13/004; G01C 13/006; G01C 21/20; B63B 15/0083; B63B 1/121; B63B 2001/123; B63B 2005/242; B63B 2015/0033; B63B 2015/005; B63B 2035/4473; B63B 2201/16; B63B 5/24; B63B 2213/02; B63B 2043/126; B63B 21/50; B63B 2203/00; B63B 22/18; B63B 43/06; B63B 49/00; B63B 1/107; B63B 1/14; B63B 25/006; B63B 27/36; B63B 35/44; B63B 25/12; B63B 35/285; B63B 2022/006; B63B 25/08; B63B 22/24; B63B 22/00; B63B 22/20; B63B 22/02; B63B 22/22; B63B 22/003; B63B 32/73; B63B 2035/006; B63B 2211/02; B63B 35/665; B63B 2025/085
USPC ............................................ 73/170.29–170.34
See application file for complete search history.

(56) References Cited

U.S. PATENT DOCUMENTS

| | | | |
|---|---|---|---|
| 8,653,967 B1* | 2/2014 | Vosburgh | B63B 22/18 340/539.26 |
| 2015/0185007 A1 | 7/2015 | Deshetler Brinton et al. | |
| 2015/0346726 A1* | 12/2015 | Davoodi | G05D 1/0206 701/21 |
| 2016/0137271 A1* | 5/2016 | MacCready | B63H 5/15 114/338 |
| 2018/0297669 A1* | 10/2018 | Toole | B63B 1/34 |

\* cited by examiner

STOKES DRIFTER

PRIORITY INFORMATION

This application claims the benefit of U.S. Provisional Patent Application No. 62/435,026, filed on Dec. 15, 2016, the disclosure of which is incorporated herein by reference in its entirety.

TECHNICAL FIELD

This disclosure generally relates to surface drifting buoys and methods of using the same.

BACKGROUND

A surface drifting buoy, hereafter referred to as a drifter, is an instrument that approximately follows water at the water surface. Drifters are defined by their geometry and positive buoyancy, which constrains them to follow the two-dimensional flow at the water surface or near surface. Drifters have a long history of use for purposes ranging from mapping large-scale ocean currents to following oil spills to aiding search and rescue operations, and there are a correspondingly large number of drifter types.

The water-following characteristics of drifters can vary widely as a function of relatively minor changes in buoyancy, float shape, and so on, owing to the complex interaction of wave characteristics, winds, currents, and buoyancy fluxes near the surface. A drifter consisting solely of a surface float provides velocities that are a mix of surface currents, Stokes drift, wave and tide effects, and direct wind forcing. Typical drifter designs often include a sea anchor, also known as a drogue, centered at a target depth beneath the surface, to average the measurement of the surface flow over a given layer, to minimize Stokes drift and prevent the drifter from capsizing. However, it may be desirable to monitor Stokes drift effects on water surface circulation.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Figure 1:
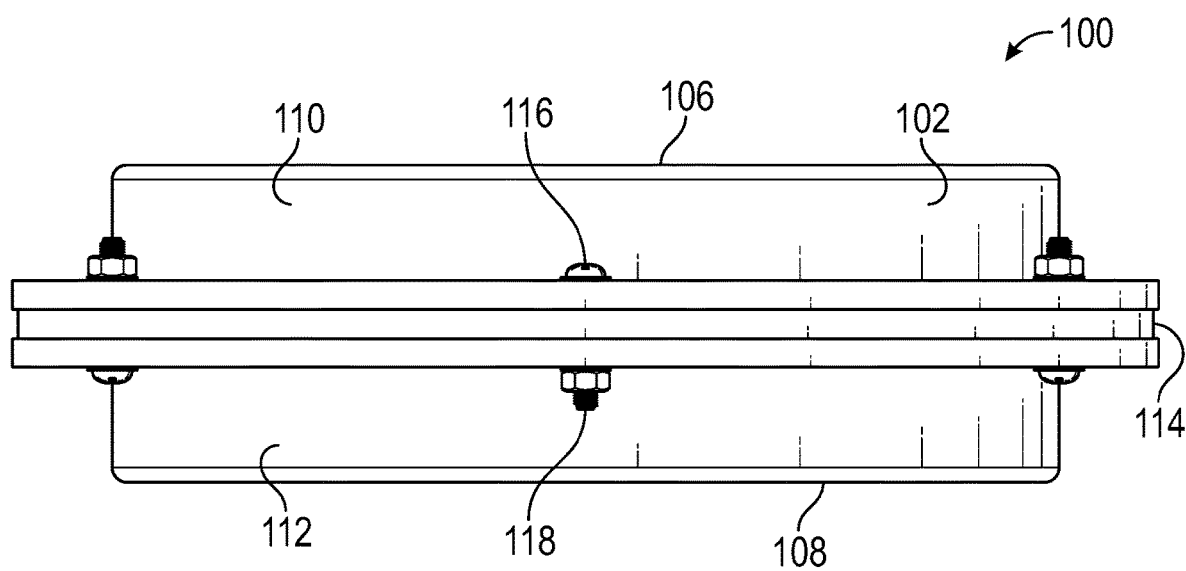
FIG. 1 shows an illustration of a drifter in accordance with one or more example embodiments of the disclosure.
Figure 2:
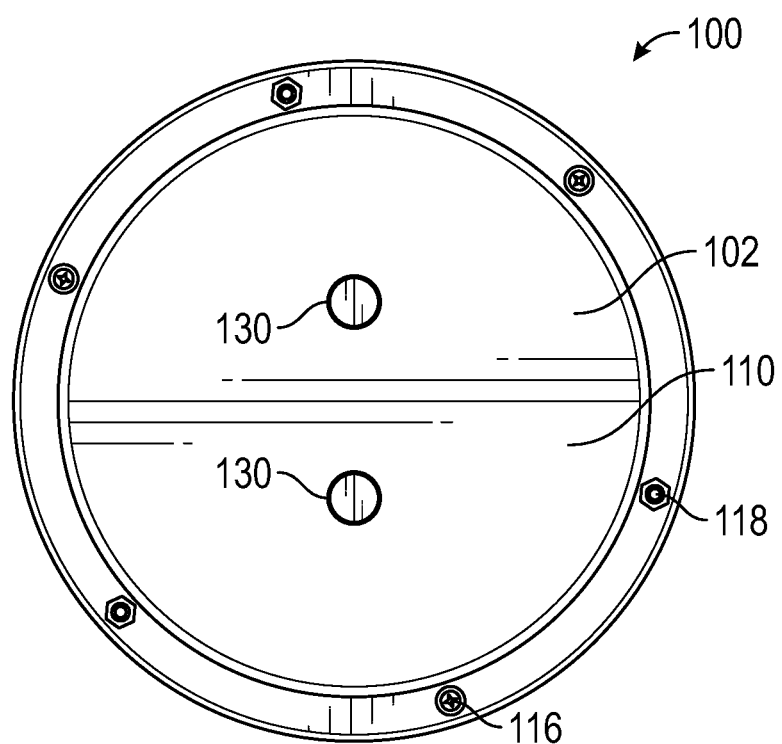
FIG. 2 shows an illustration of a drifter in accordance with one or more example embodiments of the disclosure.
Figure 3:
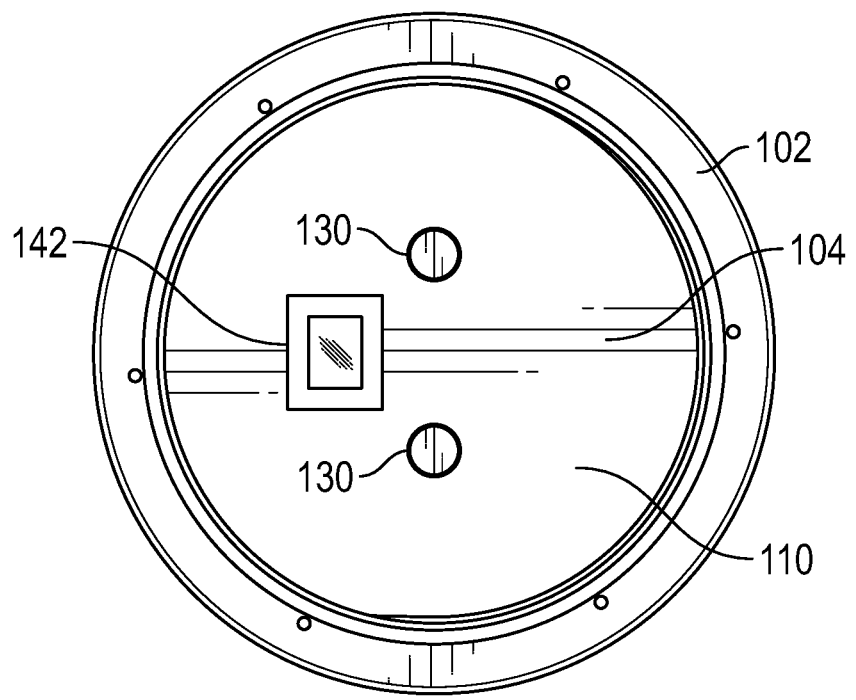
FIG. 3 shows an illustration of a drifter housing top-shell interior in accordance with one or more example embodiments of the disclosure
Figure 4:
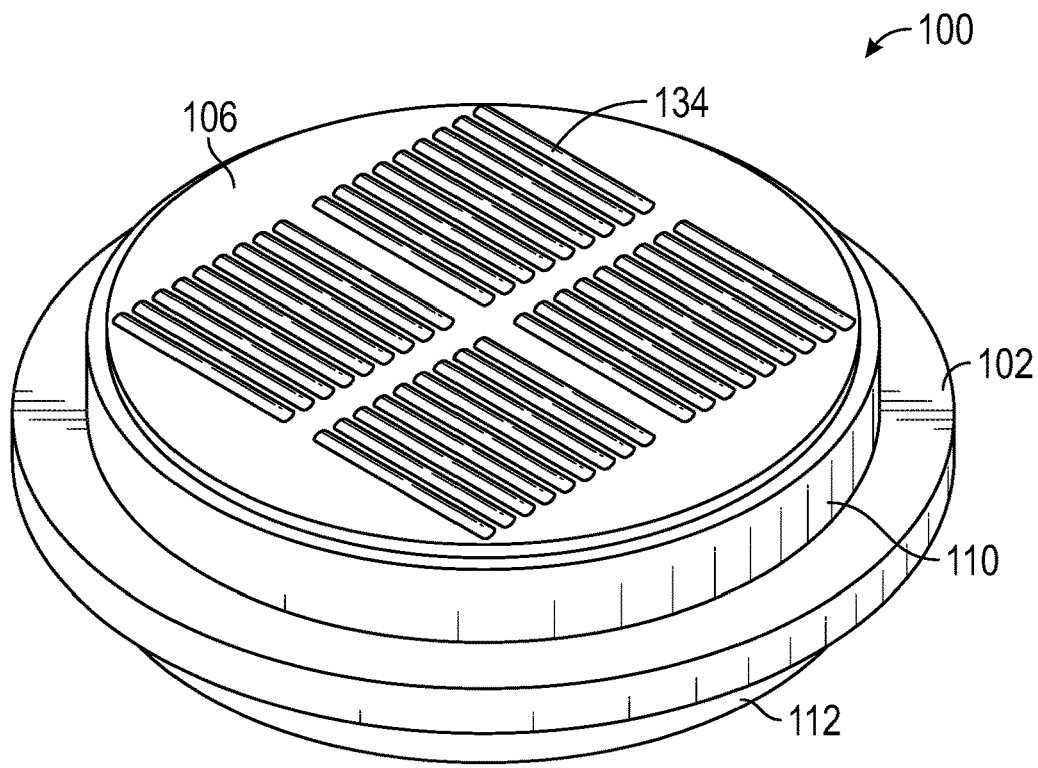
FIG. 4 shows an illustration of a drifter in accordance with one or more example embodiments of the disclosure.
Figure 5:
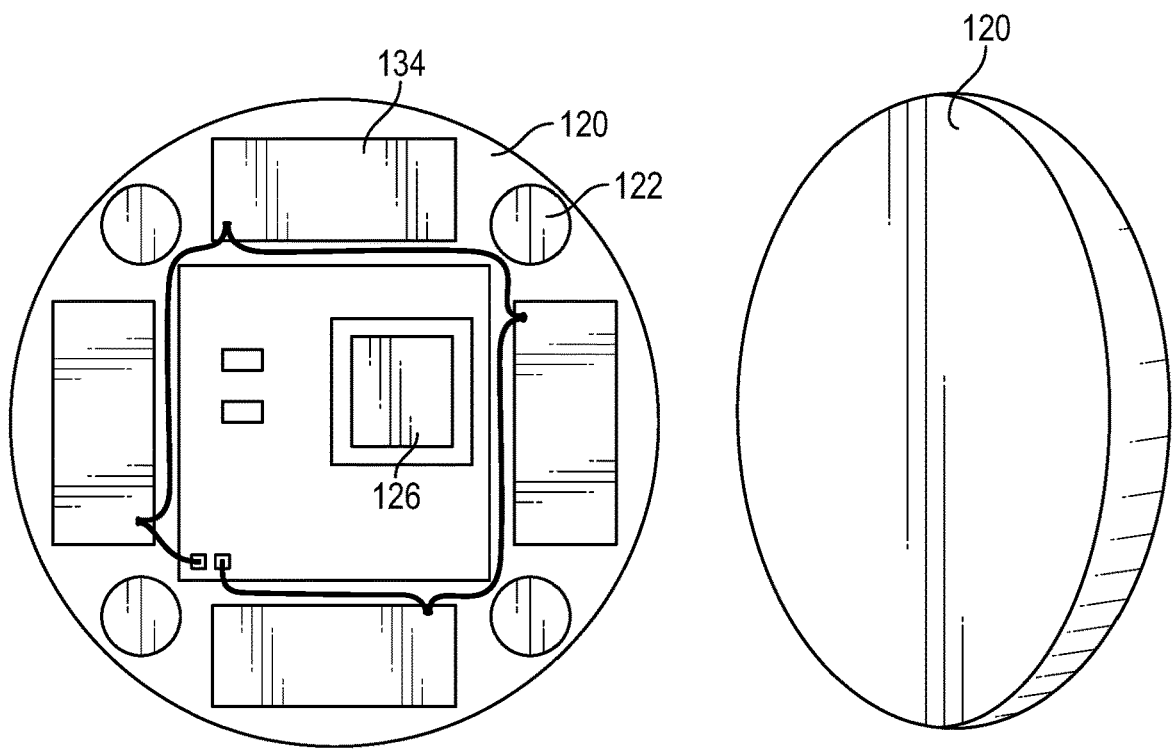
FIG. 5 shows an illustration of a drifter interior with a filler piece displaced to the side in accordance with one or more example embodiments of the disclosure.
Figure 6:
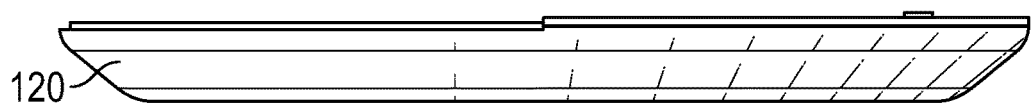
FIG. 6 shows an illustration of a drifter bottom filler piece in accordance with one or more example embodiments of the disclosure.
Figure 7:
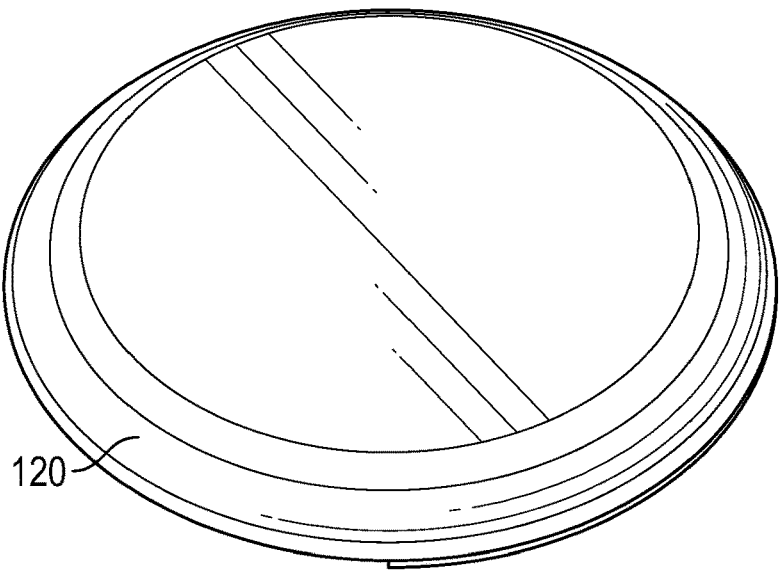
FIG. 7 shows an illustration of a drifter bottom filler piece in accordance with one or more example embodiments of the disclosure.
Figure 8:
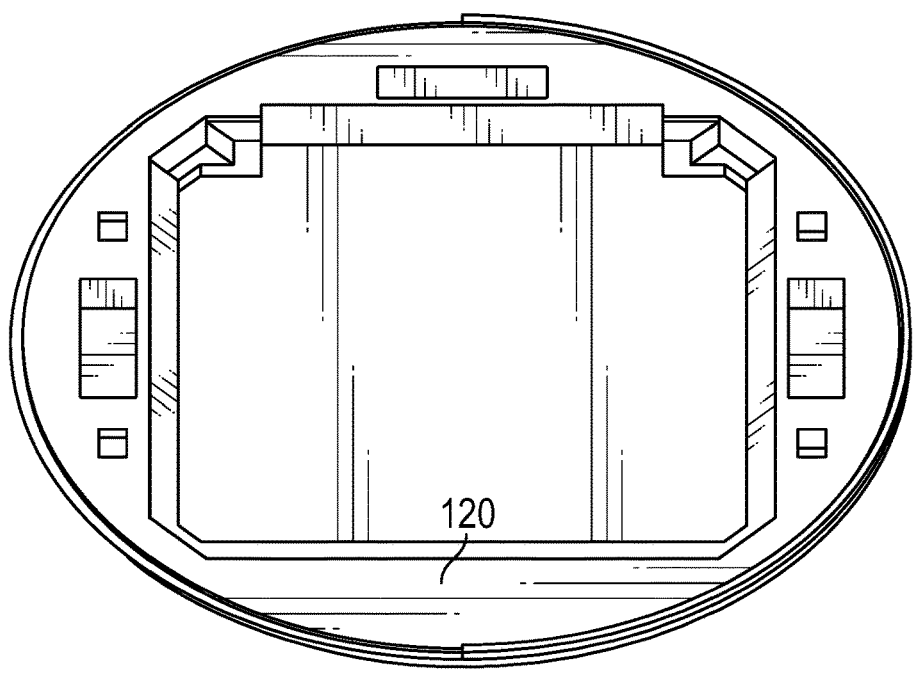
FIG. 8 shows an illustration of a drifter bottom filler piece in accordance with one or more example embodiments of the disclosure.
Figure 9:
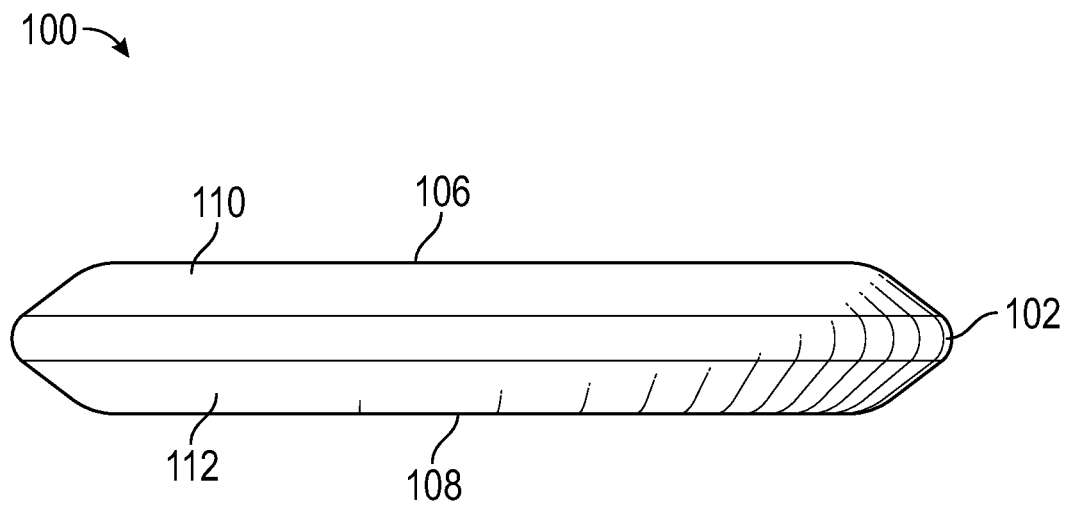
FIG. 9 shows an illustration of a drifter in accordance with one or more example embodiments of the disclosure.
Figure 10:
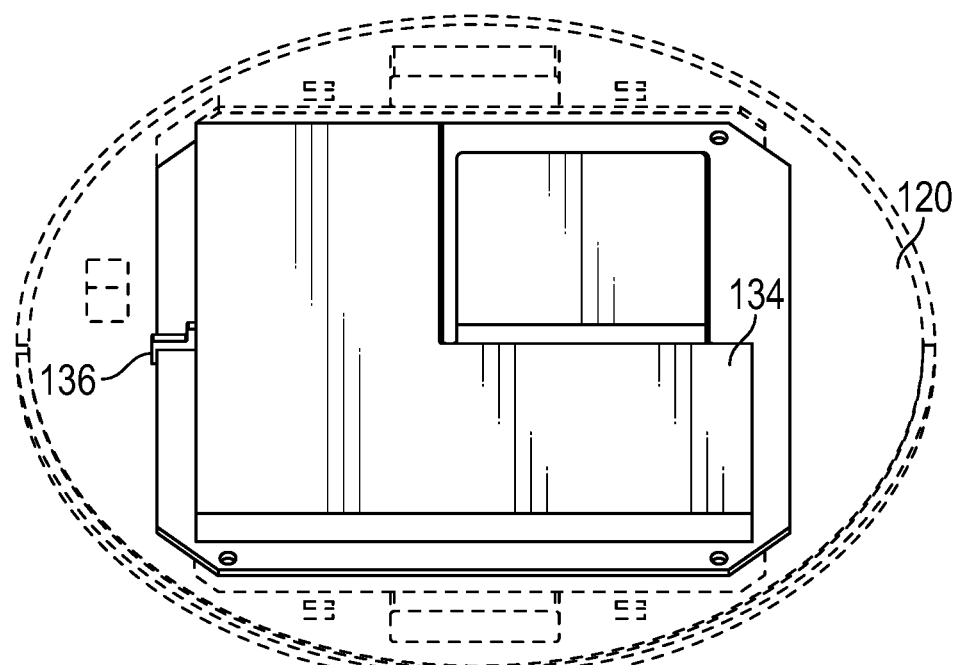
FIG. 10 shows an illustration of a drifter interior in accordance with one or more example embodiments of the disclosure.
Figure 11:
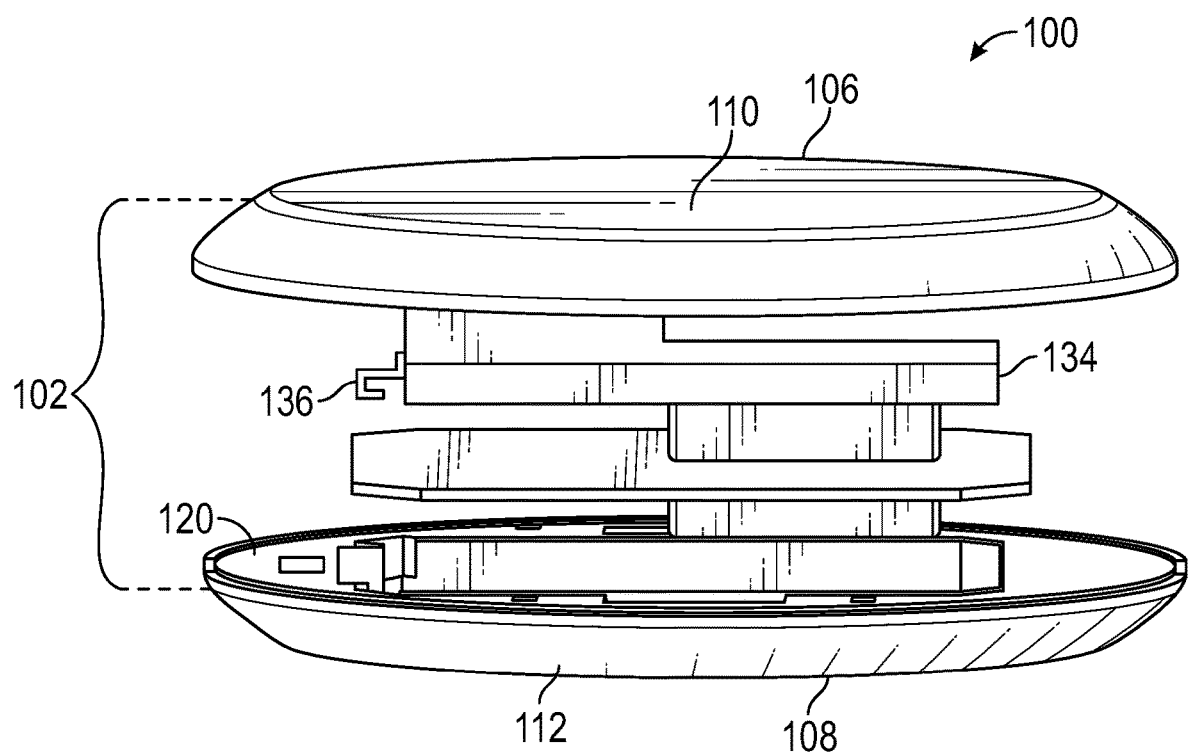
FIG. 11 shows an exploded view illustration of a drifter in accordance with one or more example embodiments of the disclosure.
Figure 12:
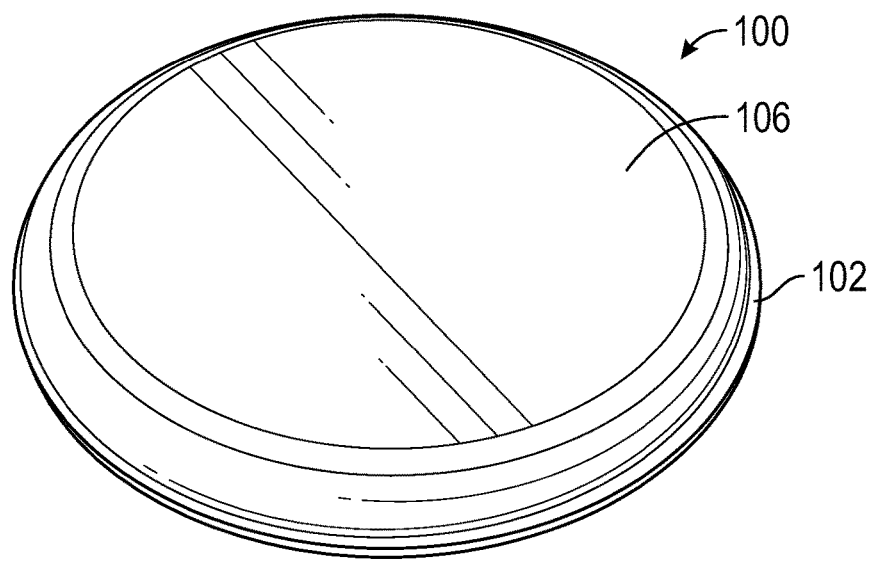
FIG. 12 shows an illustration of a drifter in accordance with one or more example embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present disclosure relates to drifters that float and take measurements at, or very near, a surface of a body of water where specific processes such as Stokes drift occur and are most pronounced (e.g., within centimeters of the water surface). The drifters may be dimensioned and configured to reduce wind force effects but not diminish Stokes drift force effects from surface gravity waves, thereby allowing isolation of Stokes drift effects at the water surface. For example, the drifters may be small drogueless drifters having a low-profile (e.g., thin) design that minimally extends above and below the water line, which minimizes wind forces and maximizes Stokes drift forces, respectively. The drifters may be designed such that Stokes drift is the primary force driving drifter movement in a body of water. The drifters may be too thin to be self-righting, and may have two antennas, one on each side of the drifter, and an accelerometer to select whichever antenna is facing the sky for use in communicating with a satellite system. The drifters may also have sensors integrated into the hull for taking measurements.

The drifters of the present disclosure may be used to investigate water surface flow and other water characteristics such as temperature, salinity, and the like. The drifters of the present disclosure may be used, for example, in surface current tracking, oceanographic and climate research, tracking fresh water lenses in an ocean after a rain, oil spill tracking and monitoring, weather forecasting, pollution tracking, river plume tracking, toxic river plume tracking, algal bloom monitoring, red tide monitoring, plastic patch monitoring, plastic patch cleaning, fish egg and larva tracking, animal migration studies, search and rescue operations, studying and measuring Stokes drift, validating numerical models, validating satellite measurements and high frequency coastal radars, and air-sea exchanges and interaction studies (which may be dependent on the temperature difference between the ocean and the atmosphere).

With reference to FIGS. 1-13, a drifter 100 according to one or more embodiments of the present disclosure is illustrated. Drifter 100 is configured to float at or near a surface of a body of water (e.g., a river, a lake, a bay, an ocean) and has a buoyancy such that a portion of drifter 100 is above the water surface and another portion of drifter 100 is submerged below the water surface. Drifter 100 is preferably dimensioned to have at least two opposing exterior surfaces: a first exterior surface 106 and an opposing second exterior surface 108. In embodiments, one surface rests above the water line and the other surface is submerged below the water line. As detailed below, drifter 100 may have components on both exterior surfaces, which enables drifter 100 to flip over in an aqueous environment and work equally well with either surface facing skyward.

Drifter 100 typically has a very small profile. Drifter 100 may have a buoyancy and be dimensioned such that it does not extend more than a set distance from the water surface. In embodiments, drifter 100 may have a buoyancy and be dimensioned such that drifter 100 extends no more than 30, 29, 28, 27, 26, 25, 24, 23, 22, 21, 20, 19, 18, 17, 16, 15, 14, 13, 12, 11, 10, 9, 8, 7, 6, 5, 4, 3, 2, 1 or fewer centimeters from the water surface in either direction (e.g., above or below the water surface), symmetrically or asymmetrically. In embodiments, drifter 100 may have a buoyancy and be dimensioned such that drifter 100 extends no more than 30, 29, 28, 27, 26, 25, 24, 23, 22, 21, 20, 19, 18, 17, 16, 15, 14, 13, 12, 11, 10, 9, 8, 7, 6, 5, 4, 3, 2, 1 or fewer millimeters from the water surface in either direction, symmetrically or asymmetrically. Preferably, drifter 100 extends somewhere between 0 to 20 millimeters above the water surface so that drifter 100 may communicate with a remote device (e.g., satellite) while minimizing the device's wind exposure. For example, drifter 100 may float in water such that about 2 to 18 mm, 5 to 15 mm, or 8 to 12 mm of drifter 100 extends above the water surface. Preferably, drifter 100 extends somewhere between 0 to 50 millimeters below the water surface. For example, drifter 100 may float in water such that about 15 to 35 mm, 20 to 30 mm, or 22 to 28 mm of drifter 100 extends below the water surface. Drifter 100 may rest symmetrically above and below the water line (e.g., 50% above, 50% below) or it may rest asymmetrically above and below the water line (e.g., 20% above, 80% below).

The small profile and buoyancy of drifter 100 may enable the device to measure the effect of the smallest waves that contribute to Stokes drift while minimizing wind drag on the device (e.g., only a small portion of the device is exposed to wind forces above the water line). Stokes drift is the result of surface gravity waves and their linear/non-linear interactions. Surface gravity waves span a few hundred kilometers (e.g., tsunamis, earthquakes, etc.) to about 25 cm, and drifter 100 may be dimensioned to have a width about the size of, or smaller than, the smallest gravity waves that exist at the surface of the ocean. Drifter 100 may also be dimensioned to have a low height profile (i.e., very thin), ensuring that drifter 100 isolates the effect of Stokes drift which is pronounced at the water surface (circulation at the water surface differs greatly from that even half a meter below).

Drifter 100 may have components (e.g., sensors, antennas, etc.) on, at, or near both exterior surfaces and be configured such that drifter 100 may repeatedly flip over in an aqueous environment and operate seamlessly regardless of drifter's 100 orientation. For example, drifter 100 may have a first orientation (e.g., first exterior surface 106 faces the water and the opposing second exterior surface 108 faces the sky), flip 180 degrees in response to an environmental condition (e.g., natural waves, storm waves) to have a second orientation (e.g., first exterior surface 106 faces the sky and the opposing second exterior surface 108 faces the water), and seamlessly continue operating. Drifter 100 may detect when the device flips and take appropriate actions based on device orientation, such as activating/deactivating components and registering whether measurements correspond to a water interface or an air interface. Drifter's 100 ability to flip in response to environmental conditions and seamlessly continue operations allows drifter 100 to both capture phenomena occurring at a water surface regardless of device orientation and capture physical phenomena that cause drifter 100 to flip (e.g., wave motion).

Drifter 100 may assume any suitable shape such as an ellipsoid, cubic, cylindrical, cuboid, or similar shape. Drifter 100 may have any suitable dimensions, such as dimensions that may support measuring and isolating Stokes drift. Preferably, drifter 100 has a width of 30 cm or less and a height of 30 centimeters or less. In embodiments, drifter 100 has a width equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 cm and a height equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 cm. In embodiments, drifter 100 has a height equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mm. In embodiments, drifter 100 may have a width-to-height ratio equal to or greater than 1.0, 1.5, 2.0, 2.5, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.5, 8.0, 8.5, 9.0, 9.5, or 10. In embodiments, drifter 100 may have a width-to-height ratio equal to or less than 1.5, 2.0, 2.5, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.5, 8.0, 8.5, 9.0, 9.5, or 10.

In an exemplary embodiment shown in FIGS. 1-5, drifter 100 has a height of 4 cm and a width (e.g., diameter) of 20 cm. In an exemplary embodiment shown in FIGS. 6-12, drifter 100 has a height of 26 mm and a width (e.g., diameter) of 162 mm. In an exemplary embodiment shown in FIGS. 6-12, drifter 100 floats in water such that about 10 mm of drifter 100 extends above the water surface and 16 mm of drifter 100 extends below the water surface.

Drifter 100 may have a buoyancy/density associated therewith. Drifter 100 may have a weight balance/distribution associated therewith. Preferably, drifter 100 is symmetrically and/or laterally weight balanced so that the device is not biased or influenced to drift in a certain direction. The buoyancy/density and weight balance of drifter 100 may be modifiable. The buoyancy/density and weight distribution of drifter 100 may be manually set prior to deployment. The buoyancy/density and weight distribution of drifter 100 may be set taking into account the shape and materials of a drifter housing 102 and the distribution of components in drifter 100. The buoyancy/density and weight distribution of drifter 100 may be set by, for example, selectively distributing weights throughout a filler piece 120 to balance drifter's 100 weight distribution and adjust its buoyancy/density, as detailed below.

Drifter 100 may comprise a housing 102 having a cavity 104 therein. Housing 102 generally encloses and protects components in the cavity (e.g., electronics) from the aquatic environment. Housing 102 may be selected to provide a specific buoyancy/density to drifter 100. Housing 102 may have one or more apertures therein for disposal of components (e.g., sensors, antennas) or portions thereof. For example, sensors or portions thereof may extend into an aperture of housing 102 so that the sensors may interface with an external environment (e.g., air or water) of drifter 100.

Housing 102 may assume any suitable shape such as an ellipsoid, cubic, cylindrical, cuboid, or similar shape. Housing 102 may have any suitable dimensions that support measuring and isolating Stokes drift. Preferably, housing 102 has a width of 30 cm or less and a height of 30 centimeters or less. In embodiments, housing 102 has a width equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 cm and a height equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 cm. In embodiments, housing 102 has a height equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mm. In embodiments, housing 102 may have a width-to-height ratio equal to or greater than 1.0, 1.5, 2.0, 2.5, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.5, 8.0, 8.5, 9.0, 9.5, or 10. In embodiments, housing 102 may have a width-to-height ratio equal to or less than 1.5, 2.0, 2.5, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.5, 8.0, 8.5, 9.0, 9.5, or 10.

Housing 102 may be made of any suitable material such as a plastic, a composite, a metal such as aluminum, a ceramic, a wood, a gel, or a combination thereof. The housing materials are typically water-impermeable and resistant to water degradation, and typically do not interfere with wireless transmissions or filter wave movements. Examples of suitable plastic materials include high density polyethylene (HDPE), acrylonitrile butadiene styrene (ABS), and biodegradable plastics such as plastics derived from algae. Example suitable gel materials include silicones, polyurethanes, and epoxy resins. The housing material may have an expected structural stability of at least two weeks, one month, three months, six months, a year, two years, three years, five years, or more in the water.

Housing 102 may be made of a single part or it may comprise two or more parts, the two or more parts affixable or fastenable to one another by any suitable means known to those of ordinary skill including, for example screws, rivets, snap fits and tabs, interference fits, plastic welding (e.g., ultrasonic welding, thermal welding, solvent welding), adhesives (e.g., glues, epoxies), tape, and the like. Housing 102 may have any suitable color or color pattern (e.g., a neutral color or camouflage to prevent discovery and capture of the device when disposed in water) or it may be transparent. Housing 102 may include labels, such as labels that dissuade persons from interfering with the device (e.g., "scientific experiment" or "please do not remove from the water").

In an exemplary embodiment shown in FIGS. 1-5, housing 102 comprises a top shell 110 and a bottom shell 112 having a rubber gasket 114 sandwiched therebetween. Top shell 110, bottom shell 112, and rubber gasket 114 are fastened together by a series of screws 116 and nuts 118 extending along the perimeter of housing 102. Top shell 110 and bottom shell 112 are made of high-density polyethylene (HDPE). HDPE is inexpensive, resilient, light-weight, allows for wireless transmissions, does not filter wave movements, and is easily thermal formed or vacuum formed.

In an exemplary embodiment shown in FIGS. 6-12, housing 102 is a gel material. Two filler pieces 120 were mated with one another to form a generally ellipsoid shape (e.g., each filler piece 120 may be a half ellipsoid cut along its major axis). The mated filler pieces 120 were dipped in a gel coat material to form a gel housing 102 made of epoxy resin.

Cavity 104 may have contained therein components (e.g., electronics) or parts of components that are not be exposed to the aquatic environment. Cavity 104 may also include one or more filler piece(s) 120. Filler piece(s) 120 may be made from, for example, polyurethanes, neoprene, silicone rubber, and foams such as ESD-safe foam. Filler piece(s) 120 may keep components in place, provide temperature insulation or regulation (e.g., insulate electronics when the drifter 100 is exposed to extreme temperatures), and adjust buoyancy by increasing the mass of drifter 100. Filler piece(s) 120 may be dimensioned to encase or have disposed therein components (e.g., electronics) or parts of components, and prevent component movement inside drifter 100. Filler piece(s) 120 may be dimensioned to receive components (e.g., depressions that accommodate components or match component shapes and contours). When there are two or more filler piece(s) 120, the filler piece(s) 120 may be designed to complementary mate with one another. For example, filler piece(s) 120 may complementary mate with one another to envelope components (e.g., electronics) therein and/or take on a shape corresponding to the overall shape of drifter 100.

Filler piece(s) 120 may include pockets, holders, or holes 122 for receipt of materials that may alter the device's buoyancy/density and weight distribution. For example, dense materials (e.g., metal weights or beads, or sand) may be selectively distributed in the pockets, holders, or holes 122 throughout filler piece(s) 120 to balance drifter's 100 weight distribution and buoyancy so that drifter 100 is perfectly weight balanced and has the desired buoyancy/density in view of the components contained therein.

Drifter 100 may be configured to communicate via one or more networks 124 with other systems, platforms, networks, devices, and so forth. Network(s) 124 may include, but are not limited to, any one or more different types of communications networks such as, for example, public networks (e.g., the Internet), private networks (e.g., frame-relay networks), wireless networks, cellular networks, satellite networks, or any other suitable private or public packet-switched or circuit-switched networks. Further, such network(s) may have any suitable communication range associated therewith and may include, for example, global networks (e.g., the Internet, a satellite network), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, a microwave medium, a radio frequency communication medium, a satellite communication medium, or any combination thereof.

In an illustrative configuration, drifter 100 may include one or more processors (processor(s)) 126, one or more memory device(s) 128 (generically referred to herein as memory 128), one or more sensor(s) 130, one or more transceiver(s) 132, one or more energy source(s) 134, an activation mechanism 136, and data storage 138. The drifter 100 may further include one or more bus(es) 140 that functionally couple various components of the drifter 100. The drifter 100 may further include one or more antenna(s) 142 for transmitting and/or receiving signals. These various components will be described in more detail hereinafter.

The bus(es) 140 may include at least one of a system bus, a memory bus, an address bus, or a message bus, and may permit exchange of information (e.g., data (including computer-executable code), signaling, etc.) between various components of the drifter 100. The bus(es) 100 may include, without limitation, a memory bus or a memory controller, a peripheral bus, and so forth. The bus(es) 100 may be associated with any suitable bus architecture including, without limitation, an Industry Standard Architecture (ISA), a Micro Channel Architecture (MCA), an Enhanced ISA (EISA), a Peripheral Component Interconnects (PCI) architecture, a PCI-Express architecture, a Personal Computer Memory Card International Association (PCMCIA) architecture, an Inter-Integrated Circuit (I$^2$C) architecture, and so forth.

The memory 128 of the drifter 100 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 128 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 128 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 138 may include removable storage and/or non-removable storage, including, but not limited to, magnetic storage, optical disk storage, and/or tape storage. The data storage 138 may provide non-volatile storage of computer-executable instructions and other data. The memory 128 and the data storage 138, removable and/or non-removable, are examples of computer-readable storage media (CRSM) as that term is used herein.

The data storage 138 may store computer-executable code, instructions, or the like that may be loadable into the memory 128 and executable by the processor(s) 126 to cause the processor(s) 126 to perform or initiate various operations. The data storage 138 may additionally store data that may be copied to memory 128 for use by the processor(s) 126 during the execution of the computer-executable instructions. Moreover, output data generated as a result of execution of the computer-executable instructions by the processor(s) 126 may be stored initially in memory 128 and may ultimately be copied to data storage 138 for non-volatile storage.

More specifically, the data storage 138 may store one or more operating systems (O/S) 144; one or more database management systems (DBMS) 146; and one or more program module(s), applications, engines, computer-executable code, scripts, or the like such as, for example, one or more drifter management module(s) 148. Any of the components depicted as being stored in data storage 138 may include any combination of software, firmware, and/or hardware. The software and/or firmware may include computer-executable code, instructions, or the like that may be loaded into the memory 128 for execution by one or more of the processor(s) 126. Any of the components depicted as being stored in data storage 138 may support functionality described in reference to correspondingly named components throughout this disclosure.

The data storage 138 may further store various types of data utilized by components of the drifter 100. Any data stored in the data storage 138 may be loaded into the memory 128 for use by the processor(s) 126 in executing computer-executable code. In addition, any data depicted as being stored in the data storage 138 may potentially be stored in one or more datastore(s) and may be accessed via the DBMS 146 and loaded in the memory 128 for use by the processor(s) 126 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 126 may be configured to access the memory 128 and execute computer-executable instructions loaded therein. For example, the processor(s) 126 may be configured to execute computer-executable instructions of the various program module(s), applications, engines, or the like of the drifter 100 to cause or facilitate various operations to be performed in accordance with one or more embodiments of the disclosure. The processor(s) 126 may include any suitable processing unit capable of accepting data as input, processing the input data in accordance with stored computer-executable instructions, and generating output data. The processor(s) 126 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 126 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 126 may be capable of supporting any of a variety of instruction sets.

Figure 13:
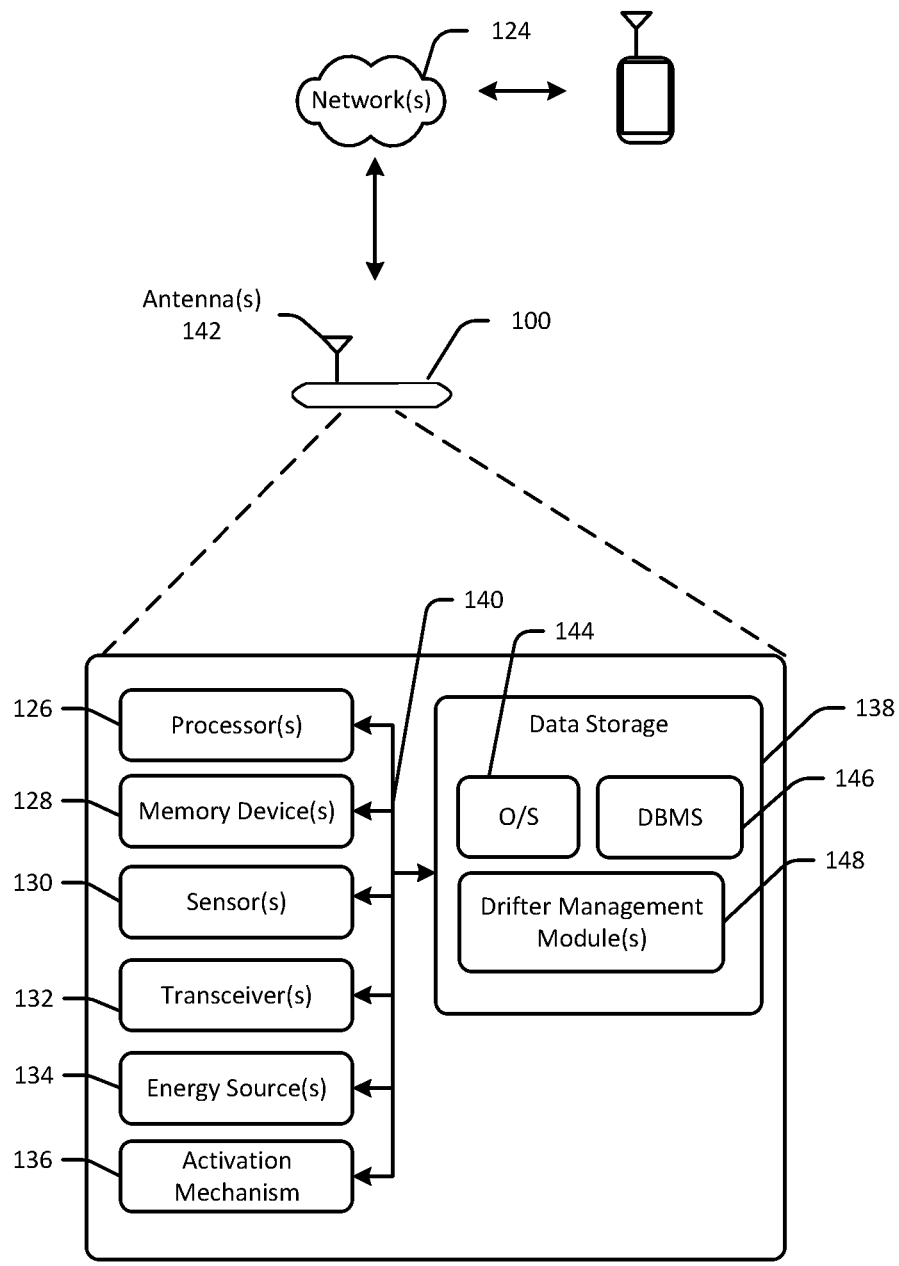
FIG. 13 is a schematic block diagram of an illustrative drifter in accordance with one or more example embodiments of the disclosure.

Referring now to functionality supported by the program module(s) depicted in FIG. 13, the drifter management module(s) 148 may include computer-executable instructions, code, or the like that responsive to execution by one or more of the processor(s) 126 may perform functions including, but not limited to, manage the operation of drifter 100 and the components contained therein.

The drifter management module(s) 148 may cause drifter 100 to communicate with one or more other systems, platforms, networks, devices, remote servers, remote datastores, cache memory data and the like, for example via wireless communication. The drifter management module(s) 148 may cause drifter 100 to send and/or receive information.

The drifter management module(s) 148 may cause drifter 100 to determine an orientation of drifter. The orientation of drifter 100 may be determined based, at least in part, on accelerometer measurements and/or other sensor measurements.

The drifter management module(s) 148 may cause drifter 100 to determine an antenna for sending and/or receiving transmissions. The drifter may have two opposing exterior surfaces, each with its own respective antenna, and the drifter may determine an antenna for sending and receiving transmissions based on an orientation of the drifter. For example, the drifter may determine to use an antenna on an exterior surface facing the air/sky for sending and/or receiving transmissions (e.g., transmissions containing global navigation satellite system (GNSS) information, sensor information, etc.)

The drifter management module(s) 148 may cause drifter 100 to determine global navigation satellite system (GNSS) information. The drifter management module(s) 148 may cause drifter 100 to activate/deactivate a GNSS transceiver and a corresponding antenna at regular time intervals, irregular time intervals, at the occurrence of an event, and the like. A regular time interval may be, for example, every 1, 2, 3, 4, 5, 10, 15, 20, 25 30, 45, 60, or more minutes. A regular time interval may be, for example, every 1, 2, 3, 4, 5, 6, 12, 24, or more hours. An event that may lead to activating/deactivating a GNSS transceiver and a corresponding antenna includes, for example, when the drifter 100 has changed orientation (e.g., the device flips 180°). The GNSS information may include geolocation information (e.g., latitude and longitude), the number of satellites used to determine the drifter's geolocation, information indicating a quality of the geolocation fix, time to GNSS lock, and horizontal dilution of precision (HDOP). Time to GNSS lock (seconds) information may indicate how many seconds it took to achieve a GNSS lock, typically in the range of 0 to 20 minutes. HDOP information may indicate the geometric quality of a GNSS satellite configuration in the sky and may be used to determine the relative accuracy of a horizontal position. The drifter management module(s) 148 may cause a GNSS transceiver and a corresponding antenna to return to a lower power or sleep mode after performing its corresponding actions until a next period of activity.

The drifter management module(s) 148 may cause drifter 100 to determine battery information. Battery information may include, for example, an indication of remaining battery charge or battery health.

The drifter management module(s) 148 may cause drifter 100 to determine sensor information. The drifter management module(s) 148 may cause drifter 100 to activate/deactivate sensor(s) at regular time intervals, irregular time intervals, at the occurrence of an event, and the like. A regular time interval may be, for example, every 1, 2, 3, 4, 5, 10, 15, 20, 25 30, 45, 60, or more minutes. A regular time interval may be, for example, every 1, 2, 3, 4, 5, 6, 12, 24, or more hours. An event that may lead to activating/deactivating sensor(s) includes, for example, when the drifter 100 has changed orientation (e.g., the device flips 180°). The drifter management module(s) 148 may cause drifter 100 to determine which sensor(s) to activate to collect information. The drifter may have two opposing exterior surfaces, each with its own respective sensor(s), and the drifter may determine which sensor(s) to use to collect information based on an orientation of the drifter. For example, the drifter may determine to use sensor(s) on an exterior surface facing the water and/or air/sky. The sensor information may include, for example, temperature information, pressure information, wind information, movement information, optical information, photosynthetically active radiation information, conductivity information, chemical analyte information (e.g., oxygen, nitrates, phosphates, pH, chlorophyll, hydrocarbons, carbon monoxide, ozone), and the like.

The drifter management module(s) 148 may cause sensor(s) to return to a lower power or sleep mode after performing its corresponding actions until a next period of activity.

The drifter management module(s) 148 may cause drifter 100 to determine a data frame. The drifter management module(s) 148 may cause drifter 100 to take various collected information (e.g., GNSS information, sensor information), stored in memory, and cause the information to be assembled and encoded into a data packet suitable for a particular communication protocol, such as a satellite communication protocol. There are many different satellite systems, each having different conventions regarding message size, message headers, and the like, and the drifter management module(s) 148 may cause drifter 100 to determine a data frame suitable for a particular satellite network or constellation. A data frame may include information such as GNSS information, time information (e.g., a date, a timestamp), software version information, sensor information, power information, drifter orientation information, gain information (e.g., resolution of sensor information) and the like. Time information may be a timestamp that counts the number of seconds since a fixed time (e.g., 2017-01-01 UTC) and may be calculated from a date derived from GNSS information. Software version information may indicate what software the device is programmed with, and the scheme used to decode transmissions from the device. Drifter orientation information may indicate an orientation of the drifter 100 in the water. Gain information may indicate a resolution of measured sensor information.

In one exemplary embodiment, a data frame has the following message format for a 9-byte message: 4-bit message part; 14-bit on board temperature; 24-bit latitude; 24-bit longitude; 1-bit orientation (which side is up); 5-bits reserved. In one exemplary embodiment, a data frame has the following message format for a 9 byte message: 4-bit message part; 14-bit temperature probe 1; 14-bit temperature probe 2; 8-bit battery health; 32-bit time stamp (e.g., UTC time, GNSS time, and the like). In one exemplary embodiment, a data frame has an 18 byte binary-format comprising two separate 9 byte messages. The first 9 byte message may include data sent in the latter half of a preceding transmission, thereby adding redundancy and increasing the likelihood of data reception by the satellite network. The second 9 byte message may include newly collected data.

The drifter management module(s) 148 may cause drifter 100 to send a data frame to a remote device, for example, a satellite. The drifter management module(s) 148 may cause drifter 100 send a data frame to a remote device at regular time intervals, irregular time intervals, at the occurrence of an event, and the like. The drifter management module(s) 148 may cause drifter 100 to activate/deactivate a satellite transceiver and a corresponding antenna at regular time intervals, irregular time intervals, at the occurrence of an event, and the like. A regular time interval may be, for example, every 1, 2, 3, 4, 5, 10, 15, 20, 25 30, 45, 60, or more minutes. A regular time interval may be, for example, every 1, 2, 3, 4, 5, 6, 12, 24, or more hours. An event that may lead to activating/deactivating a satellite transceiver and a corresponding antenna and/or sending a data frame includes, for example, when the drifter 100 has changed orientation (e.g., the device flips 180°). The drifter management module(s) 148 may cause a satellite transceiver and a corresponding antenna to return to a lower power or sleep mode after performing its corresponding actions until a next period of activity. The drifter management module(s) 148 may cause drifter 100 to send a same data frame one, two, three, or more times to a remote device (e.g., a satellite).

Sending a data packet once may be sufficient where the remote device acknowledges the receipt of the data packet (e.g., in a two-way communication system) whereas a same data packet may have to be sent multiple times when the data packet is sent over a one-way communication system, to ensure a higher probability of data packet receipt by the remote device (e.g., satellite).

Referring now to other illustrative components depicted as being stored in the data storage 138, the O/S 144 may be loaded from the data storage 138 into the memory 128 and may provide an interface between other application software executing on the drifter 100 and hardware resources of the drifter 100. More specifically, the O/S 144 may include a set of computer-executable instructions for managing hardware resources of the drifter 100 and for providing common services to other application programs (e.g., managing memory allocation among various application programs). In certain example embodiments, the O/S 144 may control execution of the program module(s).

The DBMS 146 may be loaded into the memory 128 and may support functionality for accessing, retrieving, storing, and/or manipulating data stored in the memory 128 and/or data stored in the data storage 138. The DBMS 146 may use any of a variety of database models (e.g., relational model, object model, etc.) and may support any of a variety of query languages. The DBMS 146 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the drifter 100, drifter 100 may include one or more sensor(s) 130 for measuring or detecting a property of the device or the environment surrounding the device, and recording, indicating, or otherwise responding to the property. The sensors may be disposed on, in, or near housing 102, in or near cavity 104, or a combination thereof. Drifter 100 may include one or more of the same type of sensor. Drifter 100 may include one or more different types of sensor. In embodiments, drifter 100 has duplicate sensors disposed on each of its two opposing sensor exterior surfaces. For example, drifter 100 may include two sensors of the same type, the first sensor being disposed on, in, or near the first exterior surface 106 and the second sensor being disposed on, in, or near the second exterior surface 108. An advantage of having duplicate sensors of the same type, one on each side of drifter 100, is that at least one sensor will always be water-facing and exposed to water while another sensor will always be sky facing and exposed to ambient air regardless of device orientation.

Drifter 100 may include sensors that measure or detect physical properties, biological properties, chemical properties, and the like. For example, drifter 100 may include one or more of each of the following sensors: a temperature sensor, a pressure sensor (e.g., a barometer to measure air pressure), a wind sensor, an accelerometer, a chemical analyte sensor, an optical sensor, a photosynthetically active radiation (PAR) sensor, and a conductivity sensor (e.g., a salinity sensor). Exemplary chemical analyte sensors include sensors for measuring or detecting oxygen, nitrates, phosphates, pH, chlorophyll, hydrocarbons (e.g., methane or petroleum), carbon monoxide, ozone, and the like.

In embodiments, drifter 100 may include at least two temperature sensors, one disposed on, in, or near the first exterior surface 106 and the second being disposed on, in, or near the second exterior surface 108. In these embodiments, one sensor may measure atmospheric temperature while the second sensor may measure water temperature. The two sensors may be used to detect a temperature gradient between the atmosphere and the water. Temperature is an important parameter influencing primary production (algal blooms, fish spawning), ocean density and circulation, and ocean atmosphere exchanges (hurricane formation, etc.). Temperature readings may be used to help calibrate satellites measuring ocean temperature (e.g., reduce biases in satellite-derived temperatures). Temperature readings may be used for determining interannual variations and longterm trends in the earth's surface temperature, and for climate monitoring and assimilation in numerical weather prediction and ocean forecasting models. Temperature gradients (e.g., $T_{water}-T_{air}$) may be used to investigate air sea heat exchanges, evaporation rates, and the like.

In embodiments, drifter 100 may include at least two salinity sensors, one disposed on, in, or near the first exterior surface 106 and the second being disposed on, in, or near the second exterior surface 108. Salinity sensors may be, for example, conductivity sensors. Salinity influences ocean density and circulation, and fauna/flora distribution. Salinity measurements are also useful to monitor rain, to calibrate satellites measuring sea surface salinity, and to validate numerical model outputs/results/predictions.

In embodiments, drifter 100 may include at least two nitrate sensors, one disposed on, in, or near the first exterior surface 106 and the second being disposed on, in, or near the second exterior surface 108. The nitrate sensors may, for example, be used to monitor water contamination caused by the presence of excessive amounts of nitrates arising from sources such as septic tanks, application of nitrogen-rich fertilizers, agricultural processes and animal farming, and the like. High nitrate concentrations provoke algal blooms, eutrophication, and the appearance of "dead zones" (depleted dissolved oxygen) like in the Northern Gulf of Mexico.

In embodiments, drifter 100 may include at least two pH sensors, one disposed on, in, or near the first exterior surface 106 and the second being disposed on, in, or near the second exterior surface 108. Due to the $CO_2$ concentration increase within the atmosphere, bodies of water are absorbing more and more carbon dioxide nowadays which leads to its acidification. This acidification is causing habitat destruction (e.g., destroying coral reefs), and a modification of the primary production of fauna, flora, plankton distribution, and the like. The pH sensors may therefore, for example, be used to monitor water acidification that endangers marine wildlife (e.g., coral bleaching).

In embodiments, drifter 100 may include at least one accelerometer sensor disposed in or near cavity 104. The accelerometer may, for example, be used to identify an orientation of the device (e.g., which of the two opposing exterior surfaces of drifter 100 are water/air facing). The device orientation information may be used by drifter 100 to selectively active/deactivate sensors depending on which exterior surface they are nearest (e.g., a salinity sensor is deactivated if disposed on a side that is air facing and activated if disposed on a side that is water facing). This device orientation information may also be used by drifter 100 to selectively use antennas or energy sources (discussed below) depending on which exterior surface they are nearest. The accelerometer may be used to identify the number of times a drifter flips its orientation. The accelerometer may also be used to provide measurements on wave activity (e.g., surface roughness, ocean activity), including waves at the origin of Stokes drift. For example, the accelerometer may be used to identify acceleration forces experienced by the drifter, such as those from wave motions.

Drifter 100 may include one or more antenna(s) 142 for transmitting and receiving data with any of a variety of other systems, platforms, networks, devices, and so forth. The antennas may be disposed on, in, or near housing 102, in or near cavity 104, or a combination thereof. Drifter 100 may include one or more of the same type of antenna. Drifter 100 may include one or more different types of antenna. Antenna(s) 142 may be single-band antennas, multi-band antennas such as dual-band or tri-band antennas, and/or broadband antennas. Antenna(s) 142 may be suitable for transmitting and/or receiving signals in accordance with one communication protocol (e.g., one antenna can cover only GNSS frequencies). Antenna(s) 142 may be suitable for transmitting and/or receiving signals in accordance with more than one communication protocol (e.g., one antenna can cover GNSS frequencies and satellite frequencies).

In embodiments, drifter 100 has at least two antennas, the first antenna being disposed on, in, or near the first exterior surface 106 and the second antenna being disposed on, in, or near the second exterior surface 108. An advantage of having multiple antennas, one on each side of drifter 100, is that at least one antenna will always be sky facing and/or exposed to ambient air regardless of device orientation, thereby allowing data transmission regardless of drifter 100's orientation in the water. In embodiments where drifter 100 has at least two antennas, one on each exterior surface 106/108, the at least two antennas may be individually selected for use based at least in part on an orientation of drifter 100. For example, drifter 100 may only send and receive transmissions (e.g., data packets) through antennas near an exterior surface of the drifter that is nearest the air or sky-facing.

In embodiments, drifter 100 has at least two antennas of a first type (e.g., a GNSS antenna) and two antennas of a second type (e.g., a satellite antenna), for a total of at least four antennas. In embodiments, one antenna of the first type and one antenna of the second type are disposed on, in, or near the first exterior surface 106, and one antenna of the first type and one antenna of the second type are disposed on, in, or near the second exterior surface 108. An advantage of having duplicate antennas, one on each side of drifter 100, is that at least one of each antenna type will always be sky facing and/or exposed to ambient air regardless of device orientation, thereby allowing data transmission regardless of drifter 100's orientation in the water.

The antenna(s) 142 may include any suitable type of antenna depending, for example, on the communications protocols used to transmit or receive signals via the antenna(s) 142. Non-limiting examples of suitable antennas may include directional antennas, non-directional antennas, dipole antennas, folded dipole antennas, patch antennas, multiple-input multiple-output (MIMO) antennas, or the like. The antenna(s) 142 may be communicatively coupled to one or more transceiver(s) 132 or components to which or from which signals may be transmitted or received.

The antenna(s) 142 may include an antenna configured to transmit and/or receive signals via a wireless network, a cellular antenna configured to transmit and/or receive signals via a cellular network infrastructure (e.g., UMTS, W-CDMA, CDMA2000, LTE WiMax), a Wi-Fi antenna configured to transmit and/or receive Wi-Fi signals in accordance with established standards and protocols (e.g., IEEE 802.11 family of standards), a Bluetooth antenna configured to transmit and/or receive Bluetooth signals, a Near Field Communication (NFC) antenna configured to transmit and/or receive NFC signals, a Global Navigation Satellite System (GNSS) antenna configured to transmit and/or receive GNSS signals from a GNSS satellite, a satellite antenna configured to transmit and/or receive signals with a satellite or a satellite system, and the like. The antenna(s) 142 may be configured to transmit or receive signals within any suitable frequency range.

In one exemplary embodiment, a patch antenna is disposed on either side of drifter 100. The patch antenna may be, for example, a dual-band antenna (PA45-1615-1575SA (ATI)) that covers both GPS (1575 MHz) and GlobalStar (1615 MHz) frequencies.

Drifter 100 may include one or more transceiver(s) 132 for transmitting and receiving data. For example, drifter 100 may include transceivers for satellite communication, transceivers for radio communication, transceivers for global positioning, transceivers for communication over cellular networks, and the like. The transceivers may be disposed on, in, or near housing 102, in or near cavity 104, or a combination thereof. Drifter 100 may include one or more of the same type of transceivers. Drifter 100 may include one more different types of transceivers. In embodiments, drifter 100 has multiple transceivers; each transceiver in communication with at least two antennas, the first antenna being disposed on, in, or near the first exterior surface 106, and the second antenna being disposed on, in, or near the second exterior surface 108. An advantage of having multiple antennas, one on each side of drifter 100, is that at least one antenna will always be sky facing and/or exposed to ambient air regardless of device orientation.

The transceiver(s) 132 may include any suitable component(s) for—in cooperation with the antenna(s) 142—transmitting or receiving electromagnetic signals in the bandwidth and/or channels corresponding to the communications protocols utilized by the drifter 100 to communicate with other devices. The transceiver(s) 132 may include hardware, software, and/or firmware for modulating, transmitting, or receiving—potentially in cooperation with any of antenna(s) 142—communications signals according to any of the communications protocols discussed above including, but not limited to, cellular network protocols, Wi-Fi protocols, Bluetooth protocols, NFC protocols, GNSS protocols, satellite protocols, and the like. The transceiver(s) 132 may include any receiver and baseband suitable for communicating via the communications protocols utilized by the drifter 100. The transceiver(s) 132 may further include a low noise amplifier (LNA), additional signal amplifiers, an analog-to-digital (A/D) converter, one or more buffers, a digital baseband, or the like.

In embodiments, drifter 100 may include a transceiver for satellite transmissions in communication with two antennas, a first antenna being disposed on, in, or near the first exterior surface 106 and a second antenna being disposed on, in, or near the second exterior surface 108. In embodiments, drifter 100 may include a transceiver for global positioning (e.g., a GNSS system) in communication with a first antenna being disposed on, in, or near the first exterior surface 106 and a second antenna being disposed on, in, or near the second exterior surface 108. In embodiments, drifter 100 may include at least one transceiver for satellite communication and at least one transceiver for global positioning. The at least one transceiver for satellite communication may allow for data transmission using satellite systems and the at least one transceiver for global positioning may allow for determining drifter location using an extremely accurate global navigation satellite system (GNSS).

In embodiments, transceivers may share antennas so that there need only be one antenna disposed on, in, or near each exterior surface 106/108 of drifter 100. For example, a satellite communication transceiver and a GNSS transceiver may share the same antennas so that there is one antenna disposed on, in, or near each exterior surface 106/108. In embodiments where transceivers share antenna(s), drifter 100 may be configured to determine which transceiver is able to send/receive data using which antenna to avoid interference between the two transceivers sharing the same antennas.

Transceivers and antennas may be selected based on their ability to communicate with a particular satellite constellation. Exemplary satellite constellations that drifter 100 may utilize include GlobalStar, Iridium, Orbcomm, Argos, Inmarsat, Thuraya, O3b, Streambox, and SkyTerra. A particular satellite constellation may be selected depending on various considerations. For example, some satellite constellations are better because they have more satellites. Some satellite constellations transmit in different parts of the world, so they offer different coverage. Some satellite constellations only receive data, meaning that communication is one-way, and the transceiver transmits data hoping that the satellite constellation receives the transmission. Some satellite constellations provide two-way communications with a transceiver. Some satellite constellations send the transceiver a log message indicating that data has been received and that the received data is good. This allows the transceiver to shut off for a period of time (e.g., until the next scheduled transmission). Other differences include bandwidth and communication speed.

Drifter 100 may include one or more energy source(s) 134 that generate and/or store energy for powering electronics and any mechanical devices included in drifter 100. The energy source(s) 134 may be disposed on, in, or near housing 102, in or near cavity 104, or a combination thereof. Exemplary energy source(s) 134 may include, for example, batteries and/or solar cells. Drifter 100 may include one or more of the same type of energy source(s) 134. Drifter 100 may include one more different types of energy source(s) 134. In embodiments, one or more energy source(s) 134 are selected for use in drifter 100 based on design criteria such as the drifter's 100 power needs over a period of time. For example, a drifter designed to operate for several days has considerably smaller power needs than a drifter designed to operate for several years, and the energy source(s) 134 may be tailored accordingly. As another example, a desired transmission period of drifter 100 may influence power needs and requirements.

In embodiments, drifter 100 may have solar cells disposed on each of its two opposing exterior surfaces. Thus, drifter 100 may have a first set of solar cells disposed on, in, or near the first exterior surface 106 and a second set of solar cells disposed on, in, or near the second exterior surface 108. An advantage of having duplicate solar cell sets, one on each side of drifter 100, is that at least one solar cell set will always be sky-facing regardless of device orientation.

In embodiments, drifter 100 may have one or more batteries in cavity 104. The batteries may be configured to store and provide energy. The batteries may include, for example, rechargeable batteries such as nickel metal hydride, wet cells, dry cells, lead-acid, lithium, lithium hydride, lithium-ion, or the like, at any suitable voltage and/or output current.

The batteries may have any suitable dimensions. The one or more batteries may have a design that matches the shape of drifter 100, thereby improving drifter weight balancing when the batteries are disposed centrally within drifter 100. For example, a battery and drifter 100 may both have a circular design, and the central axis of both the battery and drifter 100 may be aligned to improve weight-balancing of drifter 100. The one or more batteries may have an L-shaped design (see FIG. 10, part 134). An L-shaped battery may allow drifter 100 to assume a thinner profile than would otherwise be possible using conventional batteries. The one or more batteries may be placed equidistant about a central axis through drifter 100, so as evenly distribute weight through the drifter (see FIG. 5).

The one or more batteries may have a battery life associated therewith. Depending on the frequency of sensor measurements and data transmissions, the one or more batteries may support operation of drifter 100 for at least two weeks, one month, three months, six months, a year, two years, three years, five years, or more in the water.

Drifter 100 may include an activation mechanism 136 for use in powering on/off the drifter. The activation mechanism 136 may be a Hall Effect switch, and drifter 100 may be activated and deactivated by passing a magnet over the Hall Effect switch. The activation mechanism 136 may be near the housing or pushed up against housing 102.

It should be appreciated that the program module(s), applications, computer-executable instructions, code, or the like depicted in FIG. 13 as being stored in the data storage 138 are merely illustrative and not exhaustive, and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the drifter 100, and/or hosted on other computing device(s) accessible via one or more networks, may be provided to support functionality provided by the program module(s), applications, or computer-executable code depicted in FIG. 13 and/or additional or alternate functionality. Further, functionality may be modularized differently such that processing described as being supported collectively by the collection of program module(s) depicted in FIG. 13 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 13 may be implemented, at least partially, in hardware and/or firmware across any number of devices.

It should further be appreciated that the drifter 100 may include alternate and/or additional hardware, software, or firmware components beyond those described or depicted without departing from the scope of the disclosure. More particularly, it should be appreciated that software, firmware, or hardware components depicted as forming part of the drifter 100 are merely illustrative and that some components may not be present or additional components may be provided in various embodiments. While various illustrative program module(s) have been depicted and described as software module(s) stored in data storage 138, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, data processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Figure 14:
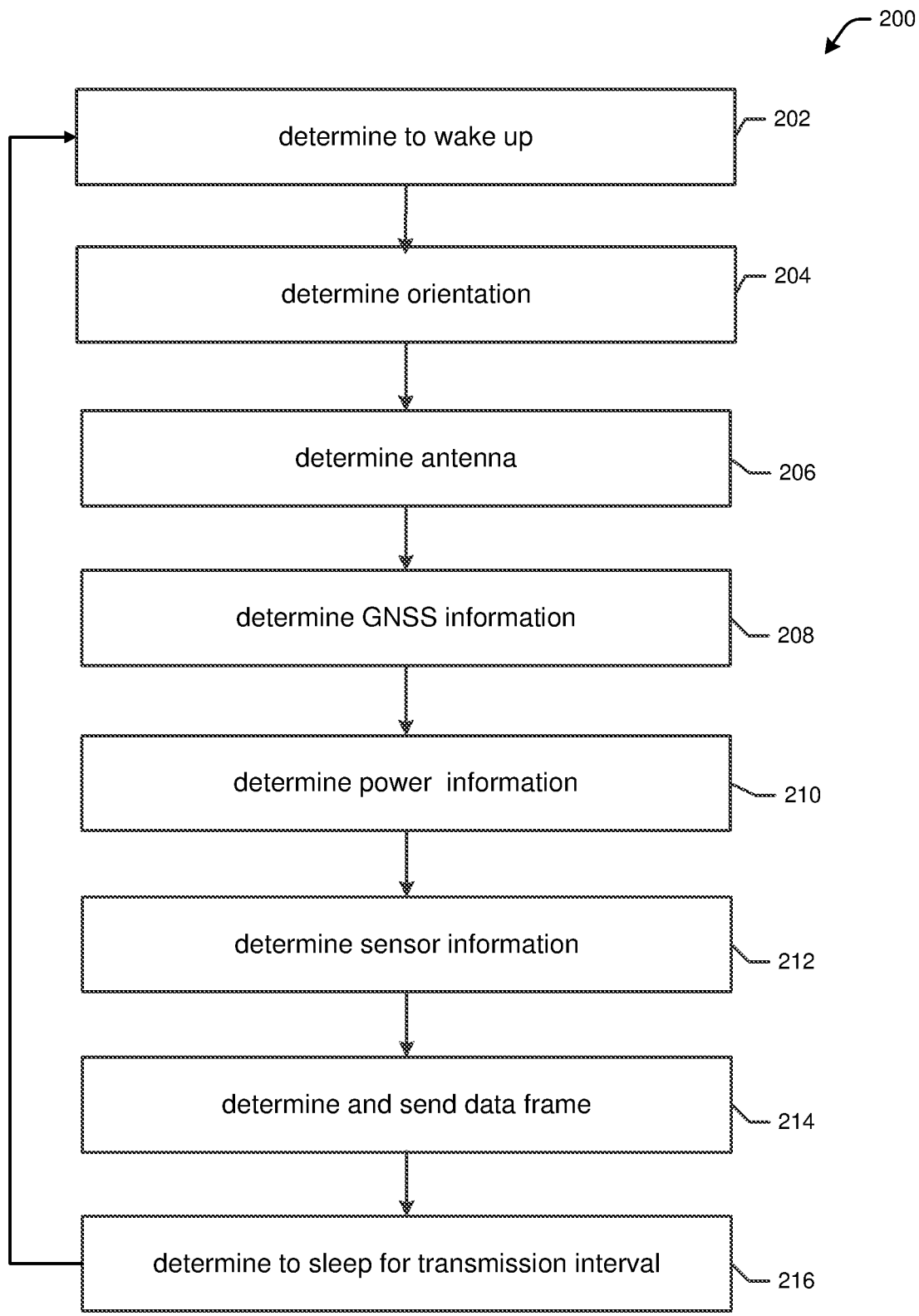
FIG. 14 shows a flowchart of a method for drifter operation in accordance with one or more example embodiments of the disclosure.

FIG. 14 is a flowchart of a method 200 for drifter operation in accordance with one or more example embodiments of the disclosure. The method 200 generally comprises determining to wake up 202, determining an orientation 204, determining an antenna for transmission 206, determining GNSS information 208, determining power information 210, determining sensor information 212, determining a data frame for transmission and sending the data frame 214, and determining to enter a sleep mode 216.

At the start of method 200, a drifter may be powered off. The drifter may be powered on by triggering an activation mechanism of the drifter. For example, the drifter may be activated by passing a magnet over a Hall effect switch in the drifter. The activated drifter may be deployed in a body of water.

In step 202, a drifter may be in a standby mode or sleep mode (e.g., a low-power mode) and may determine to wake up (e.g., enter a higher power mode). The drifter may determine to wake up, for example, when the drifter has been in a standby mode for a period of time, such as a period of time in-between scheduled transmissions.

In step 204, the drifter may determine its orientation in the water (e.g., which exterior surface faces the water and which exterior faces the air/sky). The drifter may determine its orientation based, at least in part, on accelerometer measurements and/or other sensor measurements.

In step 206, the drifter may determine an antenna for sending and/or receiving transmissions. The drifter may have two opposing exterior surfaces, each with its own respective antenna, and the drifter may determine which antenna to use for sending and receiving transmissions based on an orientation of the drifter. For example, the drifter may determine to use an antenna on an exterior surface facing the air/sky for data transmissions.

In step 208, the drifter may determine GNSS information. The GNSS information may include geolocation information (e.g., latitude and longitude), the number of satellites used to determine the drifter's geolocation, information indicating a quality of the geolocation fix, time to GNSS lock, and horizontal dilution of precision (HDOP). The drifter may fail to determine GNSS information when the drifter is unable to obtain a GNSS lock, which may occur when the drifter is outside of GNSS coverage, or there is signal interference. When no GNSS lock is achieved during a scheduled transmission period, the drifter may determine to sleep until the next transmission period.

In step 210, the drifter may determine power information such as remaining battery charge or battery health.

In step 212, the drifter may determine sensor information. The drifter may determine, for example, temperature information from a temperature sensor, pressure information from a pressure sensor (e.g., a barometer to measure air pressure), wind information from a wind sensor, acceleration information from an accelerometer, chemical information from a chemical analyte sensor, optical information from an optical sensor, photosynthetically active radiation (PAR) information from a photosynthetically active radiation (PAR) sensor, and conductivity information from a conductivity sensor (e.g., a salinity sensor). The drifter may have two opposing exterior surfaces, each with its own respective sensors, and the drifter may determine which sensors to use for taking sensor measurements based on an orientation of the drifter. For example, the drifter may determine to use sensors on an exterior surface facing the water or air, depending on the type of measurement being taken.

In step 214, the drifter may determine and send a data frame. The data frame may include information such as GNSS information, time information (e.g., a date, a timestamp), software version information, sensor information, power information, drifter orientation information, gain information (e.g., resolution of sensor information) and the like. The data frame may be sent to a satellite system, and the appropriate channel for transmission may be determined, based at least in part, on GNSS position information.

In step 216, the drifter may determine to sleep (e.g., enter a low power mode). The drifter may determine to sleep when the drifter has completed all actions associated with a scheduled transmission period (e.g., the drifter determined to wake up, an orientation, an GNSS information, power information, sensor information, and the like over a time interval defining a particular transmission period). The drifter may determine to sleep until the next scheduled transmission period, at which point the drifter may repeat steps 202-216.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

I claim:

1. A drifter comprising:
a housing having a first exterior surface and a second exterior surface opposite the first exterior surface,
a global positioning transceiver for determining location data;
a communication transceiver for wireless communications;
a first antenna associated with the first exterior surface and a second antenna associated with the second exterior surface, wherein the first and second antennas are selectively coupled to both the global positioning transceiver and the communication transceiver; and
an energy source,
wherein the drifter has a buoyancy and is dimensioned such that: (i) one of the first exterior surface and the second exterior surface is above a water surface, and the other of the first exterior surface and the second exterior surface is below the water surface; and (ii) the drifter extends no more than 30 centimeters above the water surface and no more than 30 centimeters below the water surface.

2. The drifter of claim 1, wherein the housing comprises at least one plastic selected from a high-density polyethylene (HDPE), an acrylonitrile butadiene styrene (ABS), and a biodegradable plastic.

3. The drifter of claim 1, wherein the housing comprises at least one gel selected from a silicone, a polyurethane, and an epoxy resin.

4. The drifter of claim 1, wherein the communication transceiver for wireless communications comprises a satellite transceiver for satellite communications.

5. The drifter of claim 1, wherein the first antenna and the second antenna are patch antennas.

6. The drifter of claim 1, wherein the energy source comprises a battery, a solar cell, or a combination thereof.

7. The drifter of claim 1, further comprising a sensor for taking environmental measurements, wherein the sensor comprises at least one of a temperature sensor, a pressure sensor, a wind sensor, an accelerometer, a chemical analyte sensor, an optical sensor, a photosynthetically active radiation sensor, a conductivity sensor, an oxygen sensor, a nitrate sensor, a phosphate sensor, a pH sensor, a chlorophyll sensor, a hydrocarbon sensor, a carbon monoxide sensor, and an ozone sensor.

8. The drifter of claim 1, further comprising a first sensor and a second sensor of a same sensor type, wherein the first sensor is associated with the first exterior surface and the second sensor is associated with the second exterior surface.

9. The drifter of claim 1, wherein the drifter has a buoyancy and is dimensioned such that the drifter extends no more than two centimeters above the water surface and no more than 4 centimeters below the water surface.

10. The drifter of claim 1, wherein the drifter has a height of four centimeters or less and a width of 20 centimeters or less.

11. The drifter of claim 1, wherein the drifter has an generally ellipsoid shape.

12. The drifter of claim 1, further comprising a filler piece comprising at least one of a polyurethane material, a neoprene material, a silicone rubber material, and a foam material.

13. The drifter of claim 12, wherein each of the global positioning transceiver, the communication transceiver, and the energy source are at least partially disposed in the filler piece.

14. The drifter of claim 1, further comprising a buoyancy system comprising weighted material disposed at one or more locations within a cavity of the housing.

15. The drifter of claim 1, wherein the drifter has a buoyancy and is dimensioned to not diminish Stokes drift force effects.

16. A drifter comprising:
a housing having a first exterior surface and a second exterior surface opposite the first exterior surface,
an accelerometer for detecting at least an orientation of the drifter;
a global positioning transceiver for determining location data;
a communication transceiver for wireless communications;
a first antenna associated with the first exterior surface and a second antenna associated with the second exterior surface, wherein the first and second antennas are selectively coupled to both the global positioning transceiver and the communication transceiver;
an energy source,
a sensor for taking environmental measurements;
a memory storing computer-executable instructions; and
a processor configured to access the at least one memory and execute the computer-executable instructions to:
determine the orientation of the drifter based, at least in part, on information received from the accelerometer; and
determine, based at least in part on the orientation of the drifter, to utilize the first antenna for sending a transmission, receiving a transmission, or both.

17. The drifter of claim 16, wherein the at least one processor is further configured to execute the computer-executable instructions to:
receive global positioning system information from the global positioning transceiver;
determine power information based on information received from the energy source; and
determine sensor information received from the sensor.

18. The drifter of claim 16, wherein the at least one processor is further configured to execute the computer-executable instructions to:
send, to a satellite, a data packet comprising global positioning system information, sensor information, and time information.

19. The drifter of claim 16, wherein the at least one processor is further configured to execute the computer-executable instructions to:
determine to enter a low power mode for a period of time associated with a satellite transmission period.

* * * * *

UNITED STATES PATENT AND TRADEMARK OFFICE
CERTIFICATE OF CORRECTION

PATENT NO. : 11,104,404 B2
APPLICATION NO. : 16/469924
DATED : August 31, 2021
INVENTOR(S) : Nicolas Wienders Page 1 of 1

It is certified that error appears in the above-identified patent and that said Letters Patent is hereby corrected as shown below:

In the Specification

Insert Column 1, Line 9:
--STATEMENT REGARDING FEDERALLY SPONSORED RESEARCH
This invention was made with government support under NA15OAR4320064 awarded by the National Oceanic and Atmospheric Administration. The government has certain rights in the invention.--

Signed and Sealed this
Twentieth Day of January, 2026

John A. Squires
*Director of the United States Patent and Trademark Office*